(12) United States Patent
Chaudhari et al.

(10) Patent No.: US 11,368,694 B1
(45) Date of Patent: Jun. 21, 2022

(54) ARCHITECTURE FOR RATE ESTIMATION IN VIDEO CODING

(71) Applicant: Meta Platforms, Inc., Menlo Park, CA (US)

(72) Inventors: Gaurang Chaudhari, Sunnyvale, CA (US); Yunqing Chen, Los Altos, CA (US); Zhao Wang, Newark, CA (US); Harikrishna Madadi Reddy, San Jose, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

(21) Appl. No.: 17/158,959

(22) Filed: Jan. 26, 2021

(51) Int. Cl.
| | |
|---|---|
| *H04N 11/02* | (2006.01) |
| *H04N 19/124* | (2014.01) |
| *H04N 19/176* | (2014.01) |
| *H04N 19/146* | (2014.01) |
| *H04N 19/136* | (2014.01) |
| *H04N 19/18* | (2014.01) |
| *H04N 19/60* | (2014.01) |

(52) U.S. Cl.
CPC ......... *H04N 19/124* (2014.11); *H04N 19/136* (2014.11); *H04N 19/146* (2014.11); *H04N 19/176* (2014.11); *H04N 19/18* (2014.11); *H04N 19/60* (2014.11)

(58) Field of Classification Search
CPC .. H04N 19/124; H04N 19/136; H04N 19/146; H04N 19/176; H04N 19/18; H04N 19/60
USPC .......................... 375/240.03, 240.02, 240.13
See application file for complete search history.

(56) References Cited

U.S. PATENT DOCUMENTS

| | | | |
|---|---|---|---|
| 2012/0163455 A1* | 6/2012 | Zheng ................. | H04N 19/196 375/240.13 |
| 2015/0195525 A1 | 7/2015 | Sullivan et al. | |
| 2016/0057418 A1 | 2/2016 | Lei et al. | |
| 2016/0080749 A1* | 3/2016 | He ...................... | H04N 19/126 375/240.02 |
| 2017/0324958 A1* | 11/2017 | Tandon ............... | H04N 19/172 |
| 2019/0058883 A1 | 2/2019 | Chiang et al. | |
| 2019/0124340 A1* | 4/2019 | Young ................. | H04N 19/184 |
| 2020/0359055 A1* | 11/2020 | Matsunaga .......... | H04N 19/18 |

\* cited by examiner

*Primary Examiner* — Jayanti K Patel
*Assistant Examiner* — Richard B Carter
(74) *Attorney, Agent, or Firm* — Van Pelt, Yi & James LLP (57) ABSTRACT

A quantized transform coefficient matrix is partitioned into a sequence of partition portions. The coefficients of the matrix are grouped into the sequence of partition portions based on a hardware implemented scan order. Each partition portion is processed in an order of the sequence in a first pass. For each partition portion, a group of coefficients in the partition portion is determined. For each partition portion, a first data rate estimation for the quantized transform coefficient matrix is updated based on at least some coefficients of the group of coefficients in the partition portion and a maximum end-of-block. For each partition portion, an end-of-block estimation of the quantized transform coefficient matrix is updated based on at least some coefficients of the group of coefficients in the partition portion. A first resulting data rate estimation and a true end-of-block of the quantized transform coefficient matrix are determined after the first pass.

20 Claims, 6 Drawing Sheets

ARCHITECTURE FOR RATE ESTIMATION IN VIDEO CODING

BACKGROUND OF THE INVENTION

A video coding format is a content representation format for storage or transmission of digital video content (such as in a data file or bitstream). It typically uses a standardized video compression algorithm. Examples of video coding formats include H.262 (MPEG-2 Part 2), MPEG-4 Part 2, H.264 (MPEG-4 Part 10), HEW (H.265), Theora, RealVideo RV140, VP9, and AV1. A video codec is a device or software that provides encoding and decoding for digital video. Most codecs are typically implementations of video coding formats.

Recently, there has been an explosive growth of video usage on the Internet. Some websites (e.g., social media websites or video sharing websites) may have billions of users and each user may upload or download one or more videos each day. When a user uploads a video from a user device onto a website, the website may store the video in one or more different video coding formats, each being compatible with or more efficient for a certain set of applications, hardware, or platforms. Therefore, higher video compression rates are desirable. For example, VP9 offers up to 50% more compression compared to its predecessor. However, with higher compression ratio comes higher computational complexity; therefore, improved hardware architecture and techniques in video coding would be desirable.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
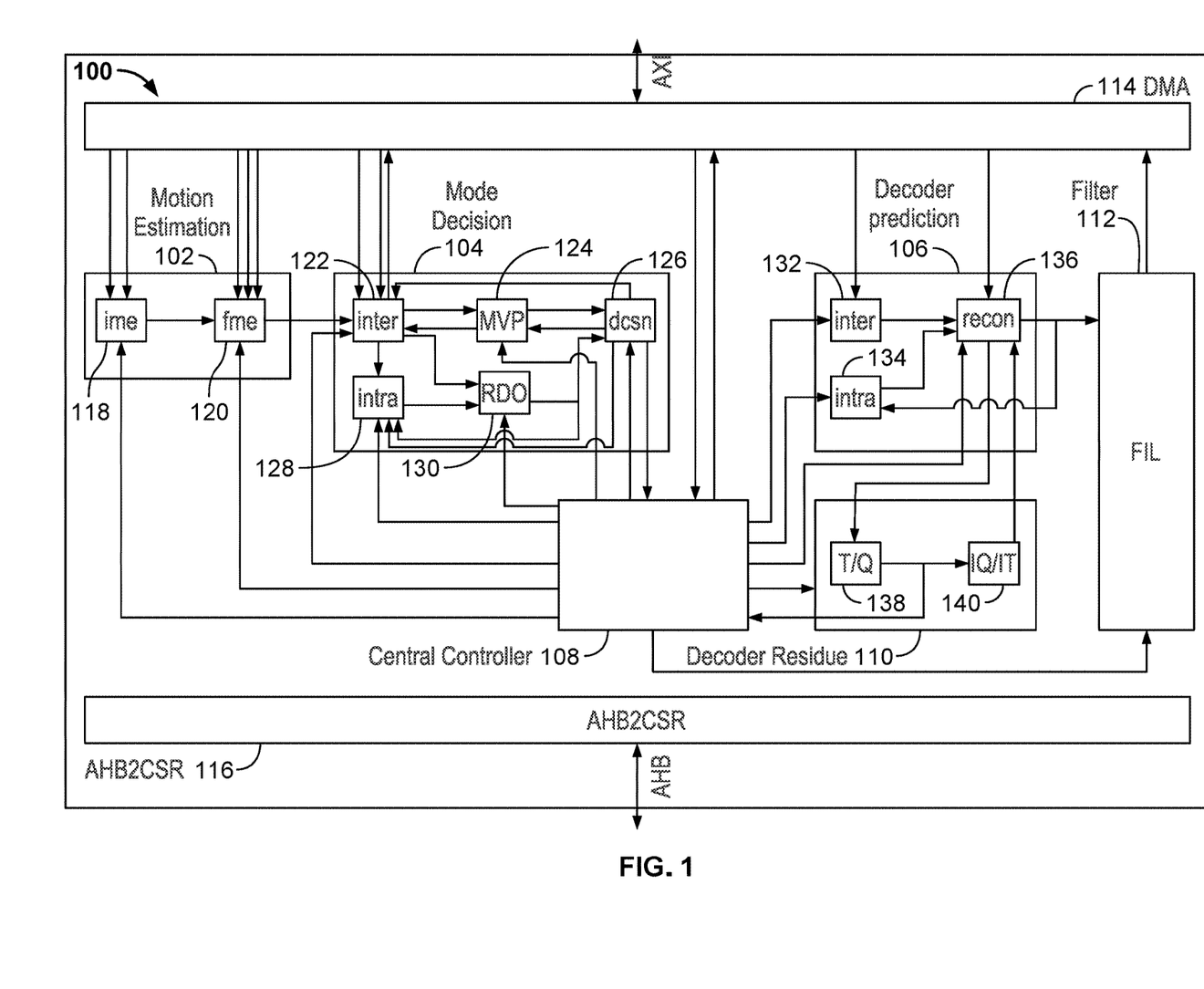
FIG. 1 illustrates a block diagram of a video encoder 100.

FIG. 1 illustrates a block diagram of a video encoder 100. For example, video encoder 100 supports the video coding format VP9. However, video encoder 100 may also support other video coding formats as well. VP9 is an open and royalty-free video coding format. VP9 is the successor to VP8 and competes mainly with MPEG's High Efficiency Video Coding (HEVC/H.265). In contrast to HEVC, VP9 support is common among modern web browsers.

Video encoder 100 includes many modules. Some of the main modules of video encoder 100 are shown in FIG. 1. As shown in FIG. 1, video encoder 100 includes a direct memory access (DMA) controller 114 for transferring video data. Video encoder 100 also includes an AMBA (Advanced Microcontroller Bus Architecture) to CSR (control and status register) module 116. Other main modules include a motion estimation module 102, a mode decision module 104, a decoder prediction module 106, a central controller 108, a decoder residue module 110, and a filter 112.

Video encoder 100 includes a central controller module 108 that controls the different modules of video encoder 100, including motion estimation module 102, mode decision module 104, decoder prediction module 106, decoder residue module 110, filter 112, and DMA controller 114.

Video encoder 100 includes a motion estimation module 102. Motion estimation module 102 includes an integer motion estimation (IME) module 118 and a fractional motion estimation (FME) module 120. Motion estimation module 102 determines motion vectors that describe the transformation from one image to another, for example, from one frame to an adjacent frame. A motion vector is a two-dimensional vector used for inter-frame prediction: it refers the current frame to the reference frame, and its coordinate values provide the coordinate offsets from a location in the current frame to a location in the reference frame. Motion estimation module 102 estimates the best motion vector, which may be used for inter prediction in mode decision module 104. An inter coded frame is divided into blocks known as macroblocks. Instead of directly encoding the raw pixel values for each block, the encoder will try to find a block similar to the one it is encoding on a previously encoded frame, referred to as a reference frame. This process is done by a block matching algorithm. If the encoder succeeds on its search, the block could be encoded by a vector, known as a motion vector, which points to the position of the matching block at the reference frame. The process of motion vector determination is called motion estimation.

Video encoder 100 includes a mode decision module 104. The main components of mode decision module 104 includes an inter prediction module 122, an intra prediction module 128, a motion vector prediction module 124, a rate-distortion optimization (RDO) module 130, and a decision module 126. Mode decision module 104 detects one prediction mode among a number of candidate inter prediction modes and intra prediction modes that gives the best results for encoding a block of video.

Intra prediction is the process of deriving the prediction value for the current sample using previously decoded sample values in the same decoded frame. Intra prediction exploits spatial redundancy, i.e., correlation among pixels within one frame, by calculating prediction values through extrapolation from already coded pixels for effective delta coding. Inter prediction is the process of deriving the prediction value for the current frame using previously decoded reference frames. Inter prediction exploits temporal redundancy.

Rate-distortion optimization (RDO) is the optimization of the amount of distortion (loss of video quality) against the amount of data required to encode the video, i.e., the rate. RDO module 130 provides a video quality metric that measures both the deviation from the source material and the bit cost for each possible decision outcome. Both inter prediction and intra prediction have different candidate prediction modes, and inter prediction and intra prediction that are performed under different prediction modes may result in final pixels requiring different rates and having different amounts of distortion and other costs.

For example, different prediction modes may use different block sizes for prediction. In some parts of the image there may be a large region that can all be predicted at the same time (e.g., a still background image), while in other parts there may be some fine details that are changing (e.g., in a talking head) and a smaller block size would be appropriate. Therefore, some video coding formats (e.g., VP9) provide the ability to vary the block size to handle a range of prediction sizes. The decoder decodes each image in units of 64×64 pixel superblocks. Each superblock has a partition which specifies how it is to be encoded. It may consist of: a single 64×64 block, two 64×32 blocks, two 32×64 blocks, or four 32×32 blocks. Each 32×32 block can also be partitioned in a similar way all the way down until an 8×8 block is reached which consists of: a single 8×8 block, two 8×4 subblocks, or four 4×4 subblocks.

Besides using different block sizes for prediction, different prediction modes may use different settings in inter prediction and intra prediction, respectively. For example, there are different inter prediction modes corresponding to using different reference frames, which have different motion vectors. For intra prediction, the intra prediction modes depend on the neighboring pixels, and in VP9, the modes include DC, Vertical, Horizontal, TM (True Motion), Horizontal Up, Left Diagonal, Vertical Right, Vertical Left, Right Diagonal, and Horizontal Down.

RDO module 130 receives the output of inter prediction module 122 corresponding to each of the inter prediction modes and determines their corresponding amounts of distortion and rates, which are sent to decision module 126. Similarly, RDO module 130 receives the output of intra prediction module 128 corresponding to each of the intra prediction modes and determines their corresponding amounts of distortion and rates, which are also sent to decision module 126.

In some embodiments, for each prediction mode, inter prediction module 122 or intra prediction module 128 predicts the pixels, and the residual data (i.e., the differences between the original pixels and the predicted pixels) may be sent to RDO module 130, such that RDO module 130 may determine the corresponding amount of distortion and rate. For example, RDO module 130 may estimate the amounts of distortion and rates corresponding to each prediction mode by estimating the final results after additional processing steps (e.g., applying transforms and quantization) are performed on the outputs of inter prediction module 122 and intra prediction module 128. Decision module 126 evaluates the cost corresponding to each inter prediction mode and intra prediction mode. The cost is based at least in part on the amount of distortion and the rate associated with the particular prediction mode. In some embodiments, the cost may be a linear combination of the amount of distortion and the rate associated with the particular prediction mode; for example, cost=distortion+$\lambda$*rate, where $\lambda$ is a Lagrangian multiplier. Other additional costs may include the cost of sending a motion vector in the bit stream. Decision module 126 selects the best inter prediction mode that has the lowest overall cost among all the inter prediction modes. In addition, decision module 126 selects the best intra prediction mode that has the lowest overall cost among all the intra prediction modes. Decision module 126 then selects the best prediction mode (intra or inter) that has the lowest overall cost among all the prediction modes. The selected prediction mode is the best mode detected by mode decision module 104.

After the best prediction mode is selected by mode decision module 104, the selected best prediction mode is sent to central controller 108. Central controller 108 controls decoder prediction module 106, decoder residue module 110, and filter 112 to perform a number of steps using the mode selected by mode decision module 104. This generates the inputs to an entropy coder that generates the final bitstream. Decoder prediction module 106 includes an inter prediction module 132, an intra prediction module 134, and a reconstruction module 136. If the selected mode is an inter prediction mode, then the inter prediction module 132 is used to do the inter prediction, whereas if the selected mode is an intra prediction mode, then the intra prediction module 134 is used to do the intra prediction. Decoder residue module 110 includes a transform and quantization module (T/Q) 138 and an inverse quantization and inverse transform module (IQ/IT) 140.

Figure 2:
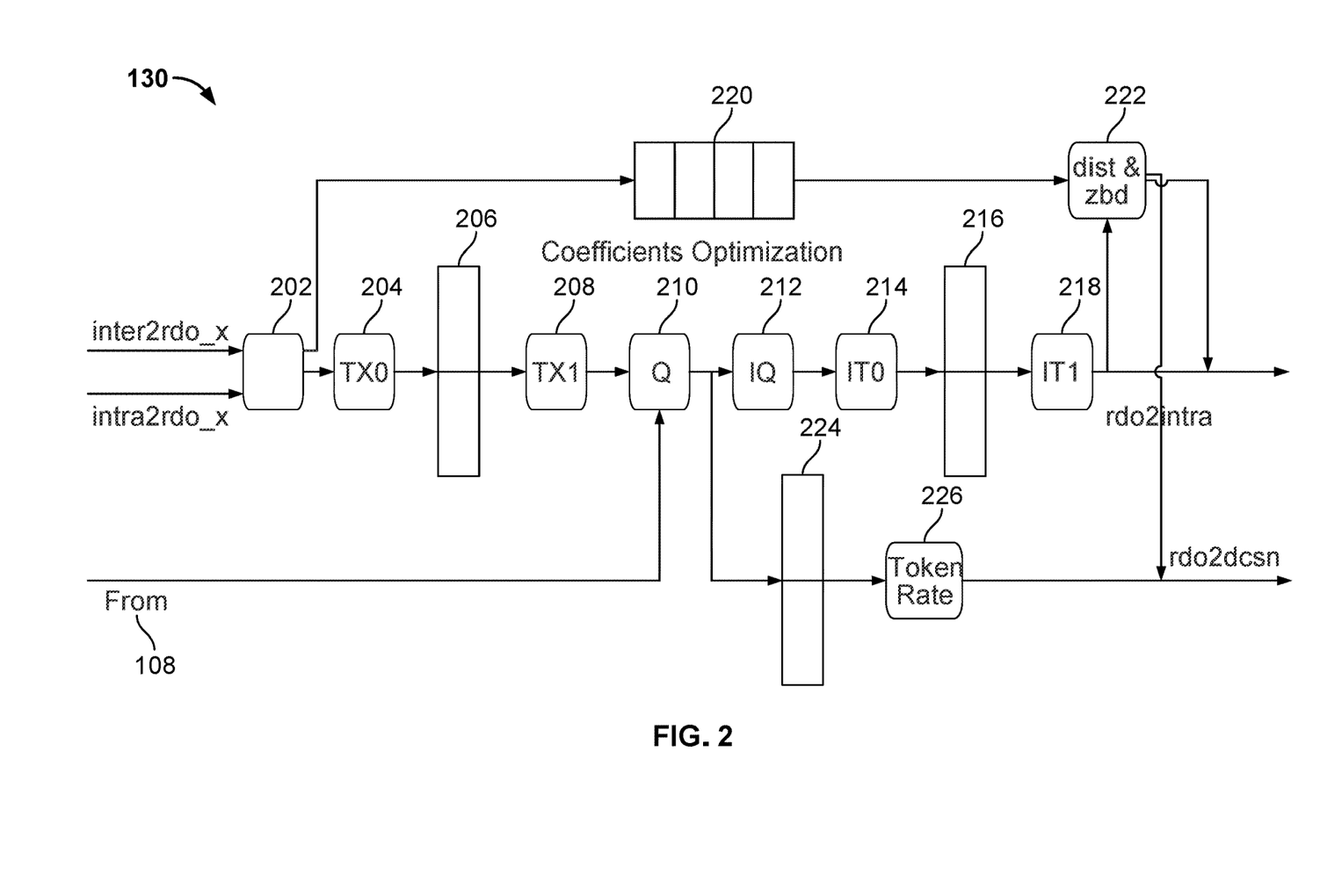
FIG. 2 illustrates an exemplary block diagram of RDO module 130.

FIG. 2 illustrates an exemplary block diagram of RDO module 130. RDO module 130 includes an arbiter and buffer module 202 for receiving inputs from inter prediction module 122 and intra prediction module 128, respectively. The received inputs include the residual data (i.e., the differences between the original pixels and the predicted pixels) corresponding to different prediction modes. These pixels are then transformed using a 2-dimensional transform performed by two stages of transform modules, TX0 module 204 and TX1 module 208, with a transpose operation module 206 in between. After the transform, the transformed values form a transform block, which is a square transform coefficient matrix with a DC coefficient and a plurality of AC coefficients. The transform coefficients are then compressed further by quantizing the coefficients via a quantization module 210.

In order to estimate the amounts of distortion experienced by the decoder, a number of processing steps are performed on the quantized coefficients. Inverse quantization (i.e., dequantization) is performed by a dequantization module 212 and an inverse transform is performed by two stages of inverse transform modules, IT0 module 214 and IT1 module 218, with a transpose operation module 216 in between. The results after the inverse transform are then compared with the original block of residual pixels at the output of a buffer 220 by a distortion estimation module 222, such that the amounts of distortion corresponding to different prediction modes are determined and sent to decision module 126.

The rates associated with sending the data corresponding to a block in a bitstream are also estimated by RDO module 130. The quantized coefficients at the output of quantization module 210 are sent to a ping-pong buffer 224 and a token rate module 226, where the rate associated with a particular block may be estimated. The rates are estimated by token rate module 226 without performing the actual encoding, because the actual encoding of the bitstream is computationally intensive and requires additional information, e.g., neighbor dependency or other neighbor information, which is not available.

Rate estimation by token rate module 226 is performed for every transform unit (TU) that goes through the RDO process in mode decision module 104. The rate estimation is based on the quantized coefficients. In a software implementation, the end-of-block (EOB) is known at the beginning of the rate estimation, with the advantage that only the coefficients up to the EOB are evaluated, as will be described below.

Because the purpose of the transform is to concentrate the energy in only a few significant coefficients, after quantization, the non-significant transform coefficients are reduced to zeros or near zeros, and therefore the quantized transform coefficient matrix typically has only a non-zero DC coefficient and a small number of non-zero AC coefficients. The EOB is the location in the matrix where all of the subsequent coefficients are zeros.

The first coefficient is the DC coefficient and its rate is computed based on a function of the coefficient value, the neighbor context, and the token cost. The subsequent AC coefficients are evaluated based on a scan order defined by a scan table that specifies a path through the quantized transform coefficient matrix that is most likely to find all non-zero coefficients while encountering as few zero coefficients as possible. Different modes and different transform types may use a different scan order. The rate of an AC coefficient is computed based on a function of the coefficient value, the neighbor context, and the token cost. In a software implementation, since the EOB is known from the beginning and since the scan order is followed, only the coefficients until the EOB value are evaluated.

A hardware implementation of rate estimation faces greater challenges. In hardware, coefficients are not processed in scan order, but in raster order or in columns. In addition, to support the high throughput, the design needs to be highly pipelined. In a raster scan, a two-dimensional rectangular raster is mapped into a one-dimensional raster, wherein the entry point of the one-dimensional raster starts from the first row of the two-dimensional raster, and the scanning proceeds to the second row, then the third row, and so on. Each raster row is scanned in left to right order.

In hardware, if the coefficients need to be accessed in any desired scan order, one method is to store the entire transform unit in a memory. However, storing the entire transform unit in memory may not be feasible because it requires a large amount of storage and it may not meet performance throughput requirements. In addition, a codec typically supports multiple scan orders. As a result, the access patterns from memory can be quite different.

On the other hand, if the coefficients are processed in an order other than scan order (e.g., an order that reduces the amount of logic and power), the neighbor information needed when a particular coefficient is evaluated may not be available in hardware.

Another problem is that the EOB is not known until the entire transform unit is processed completely. This requires the storing of the entire transform unit in a memory, such that the EOB may be found before proceeding with the rate calculation. If storing the transform unit in memory is not feasible and the EOB is not known, then the scan order may be difficult to implement in hardware. For example, it would be difficult to determine if a given coefficient is valid, i.e., within the EOB bound, or to account for coefficients that are zero and outside the EOB bound but are still contributing to the rate.

In the present application, a video processor is disclosed. The video processor comprises an interface that receives a specification of a candidate mode of a portion of a video. The video processor further comprises a rate estimation module. The rate estimation module is configured to partition a quantized transform coefficient matrix associated with the portion of the video into a sequence of partition portions. The coefficients of the quantized transform coefficient matrix are grouped into the sequence of partition portions based on a hardware implemented scan order, wherein the hardware implemented scan order is different from a specified scan order of the candidate mode. The rate estimation module is configured to process each partition portion in an order of the sequence in a first pass. For each partition portion, a group of coefficients in the partition portion is determined. For each partition portion, a first data rate estimation for the quantized transform coefficient matrix is updated based on at least some coefficients of the group of coefficients in the partition portion and a maximum end-of-block. For each partition portion, an end-of-block estimation of the quantized transform coefficient matrix is updated based on at least some coefficients of the group of coefficients in the partition portion. A first resulting data rate estimation and a true end-of-block of the quantized transform coefficient matrix are determined after the first pass.

The video processor has many benefits. Rate estimation is performed while maintaining the performance throughput. The quantized transform coefficients are processed in raster order without the need to store the entire transform unit in memory.

Figure 3:
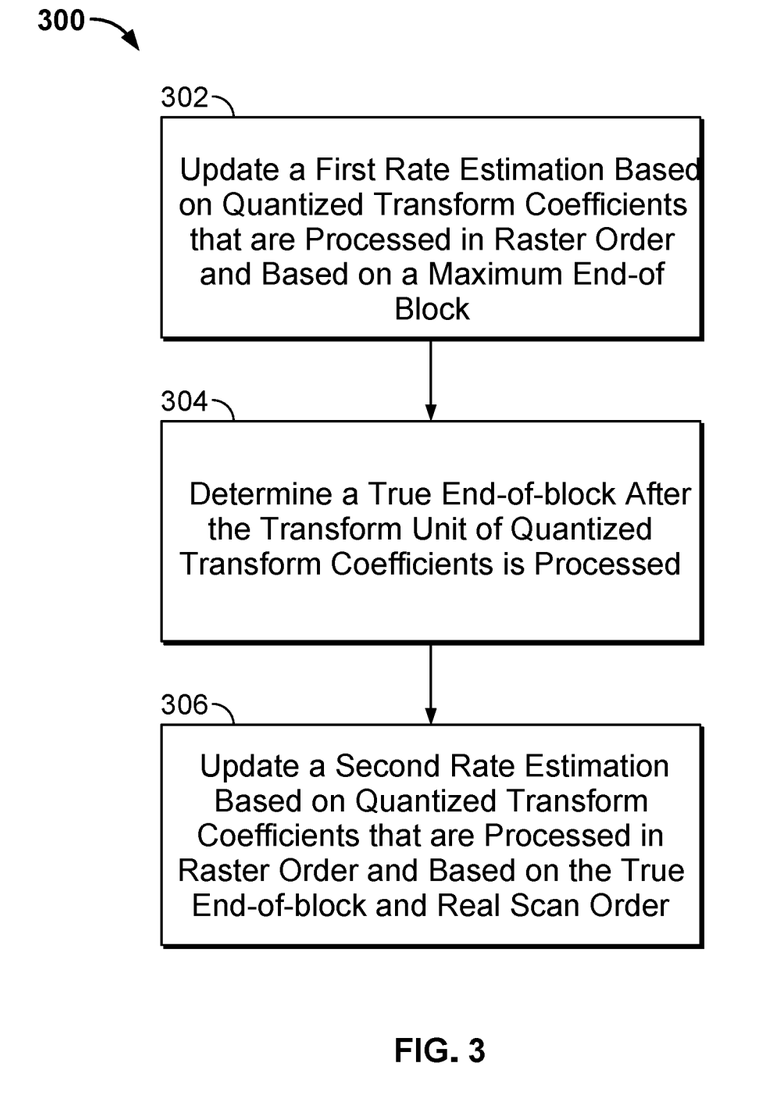
FIG. 3 illustrates a process 300 for rate estimation.

FIG. 3 illustrates a process 300 for rate estimation. In some embodiments, process 300 may be performed by at least some modules in mode decision module 104, including rate-distortion optimization (RDO) module 130. The rate estimation may be performed for every transform unit (TU) that goes through the RDO process in mode decision module 104. The rate estimation is based on the quantized transform coefficients. The rate estimation is performed in a two-pass process by splitting the rate calculation into two separate passes. In the first pass, an intermediate rate estimation is determined. In the second pass, a more accurate rate estimation is determined. In some embodiments, both the first pass and the second pass are performed to obtain the second more accurate rate estimation, which is used for client devices or platforms that require more accurate rate estimations. In some embodiments, only the first pass is performed to obtain the intermediate rate estimation, and the second pass is disabled. This configuration is useful for power saving. It is also useful for devices or platforms (e.g., edge devices) where computing resources are limited. In some embodiments, the first pass is combined with a coefficient optimization process, and then the second pass is performed. The inputs to the coefficient optimization process are the quantized coefficients.

At step 302, a first data rate estimation corresponding to a transform unit of quantized transform coefficients is updated based on a plurality of quantized transform coefficients that are processed in raster order and based on a maximum end-of-block of the transform unit. The first data rate estimation is evaluated inline, i.e., keeping and maintaining the input throughput and in raster order.

A specific scan order is associated with the transform unit of quantized transform coefficients. The specific scan order is determined based on a number of parameters, including the video coding format standard, the prediction mode, and the transform type. The scan order may be defined by a scan table that specifies a path through the quantized transform coefficient matrix that is most likely to find all non-zero coefficients while encountering as few zero coefficients as possible. The quantized transform coefficients are expected to be processed based on the specific scan order. At step 302, instead of using the specific scan order to process the quantized transform coefficients and to calculate the rate, a first rate estimation is updated based on the plurality of quantized transform coefficients that are processed in raster order, wherein the latter is different from the specific scan order. In a raster scan, a two-dimensional rectangular raster is mapped into a one-dimensional raster, wherein the entry point of the one-dimensional raster starts from the first row of the two-dimensional raster, and the scanning proceeds to the second row, then the third row, and so on. Each raster row is scanned in left to right order.

In a software implementation, since the specific scan order for the quantized transform matrix may be followed and the EOB is known, only the non-zero coefficients and the zero coefficients that are prior to the EOB may be used for updating the rate estimation. Since the EOB is known, the quantized transform coefficients may be represented in a one-dimensional string and an EOB code marks the location in the string where all succeeding coefficients are zero. The EOB position is the position of the last non-zero coefficient in the transform matrix. For example, the one-dimensional string may be [79 0 –1 –1 –1 –1 0 0 –1 EOB]. All the coefficients (both non-zero coefficients and zero coefficients) are needed for calculating the rate, but all the zero coefficients after the EOB are not used.

In a hardware implementation, as discussed above, the EOB of the quantized transform matrix is not known prior to the scanning and processing of the coefficients in raster order. When a zero coefficient in raster order is evaluated, it may still contribute to the rate estimation because whether it is a zero coefficient prior to or after the EOB when scanned in the appropriate scan order cannot be determined at the moment. Therefore, at step 302, the rate estimation is updated based on the quantized transform coefficients that are processed in raster order but the EOB is assumed to be the maximum EOB possible value, i.e., at the end of the entire quantized transform coefficient matrix.

EOB=default_EOB=the maximum EOB possible value.

For example, for an 8×8 quantized transform matrix, the EOB is set to the location (7, 7), which is the coefficient on the $8^{th}$ row and the $8^{th}$ column. For a 16×16 quantized transform matrix, the EOB is set to the location (15, 15), which is the coefficient on the $16^{th}$ row and the $16^{th}$ column. The final EOB_token_cost is also based on the EOB=default_EOB.

Figure 4:
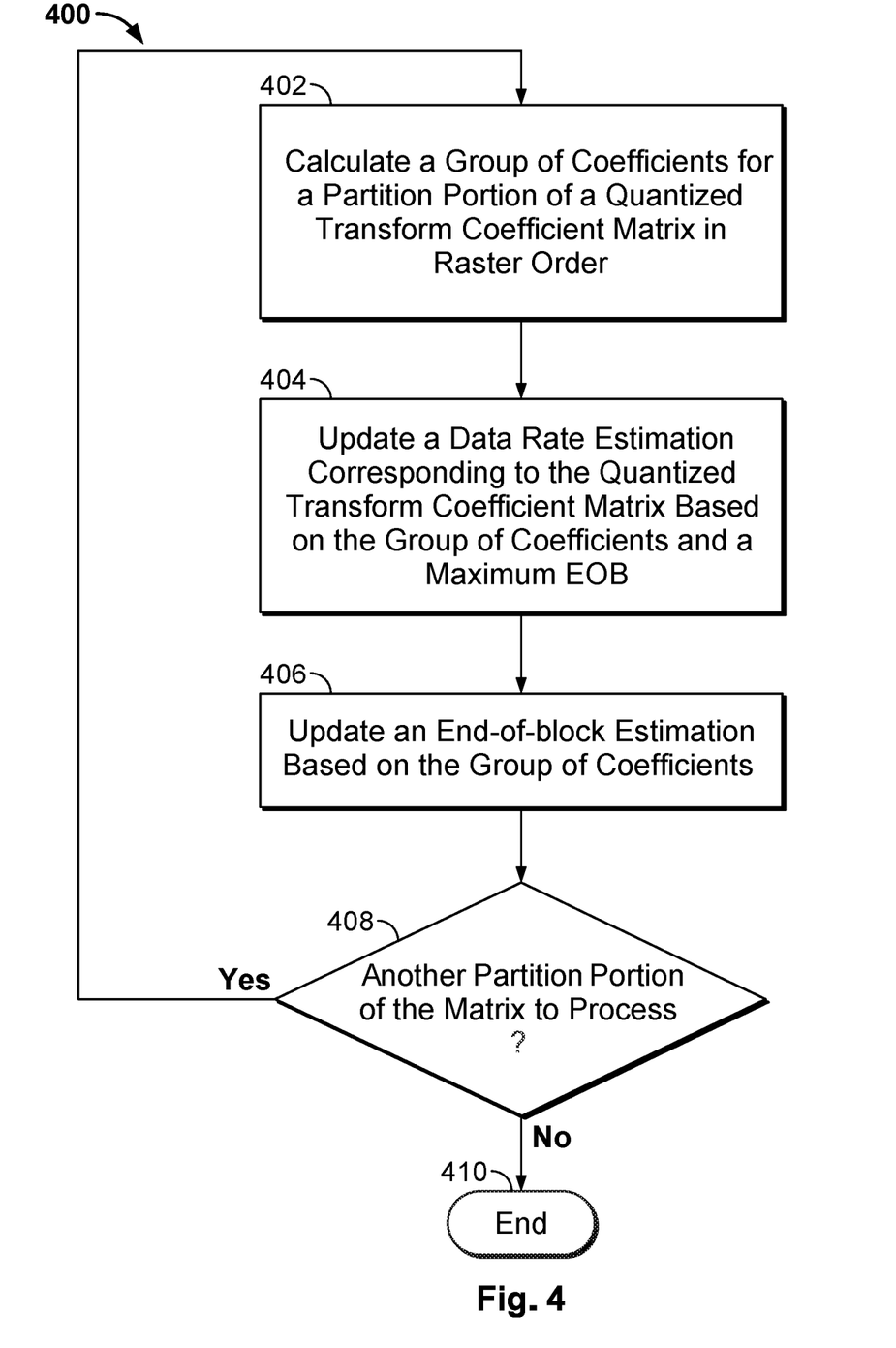
FIG. 4 illustrates a process 400 for determining a first rate estimation corresponding to a transform unit of quantized transform coefficients.
Figure 5A:
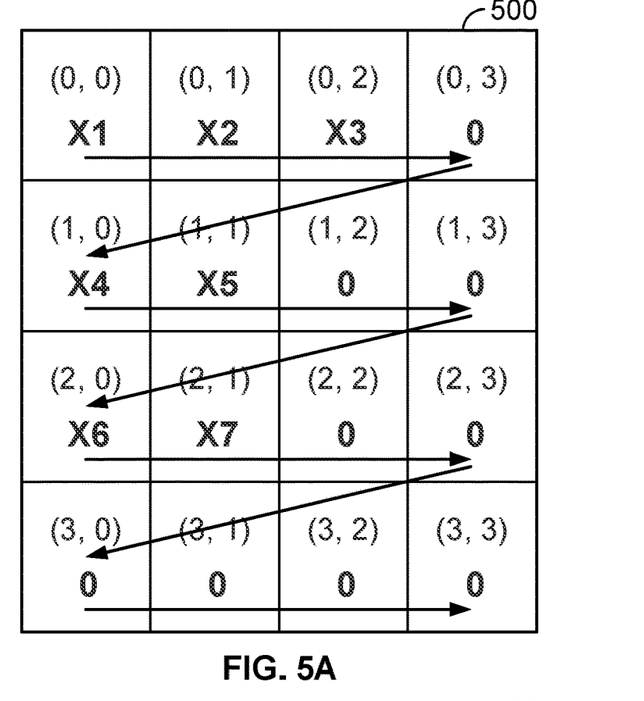
FIG. 5A illustrates an example of scanning a 4×4 quantized transform coefficient matrix 500 in raster order, which will be used in process 400.
Figure 5B:
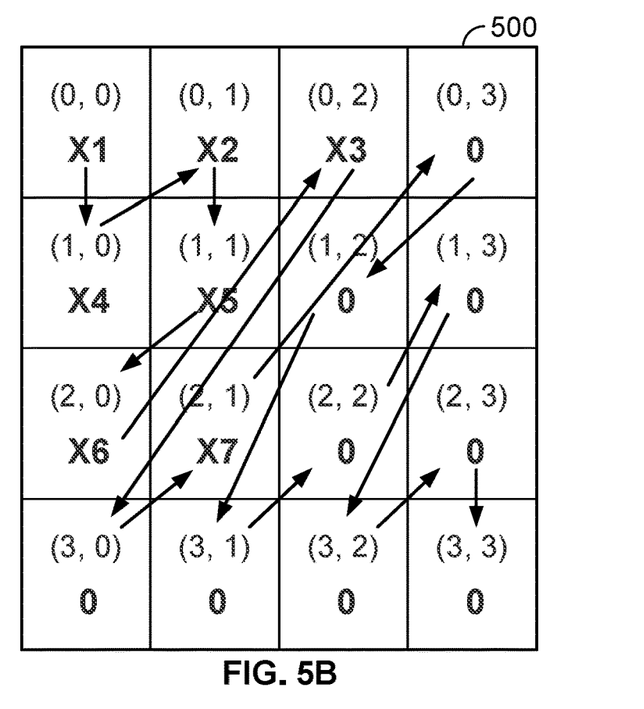
FIG. 5B illustrates an example of scanning the 4×4 quantized transform coefficient matrix 500 in the correct scan order which is different from raster order.

FIG. 4 illustrates a process 400 for determining a first rate estimation corresponding to a transform unit of quantized transform coefficients. In some embodiments, process 400 may be performed at step 302 to update a first data rate estimation based on the plurality of quantized transform coefficients that are processed in raster order and based on a maximum end-of-block of the transform unit. FIG. 5A illustrates an example of scanning a 4×4 quantized transform coefficient matrix 500 in raster order, which will be used in process 400. As a comparison, FIG. 5B illustrates an example of scanning the 4×4 quantized transform coefficient matrix 500 in the correct scan order which is different from raster order. As shown in FIGS. 5A and 5B, quantized transform coefficient matrix 500 includes both non-zero and zero coefficients. The non-zero coefficients are X1, X2, X3, X4, X5, X6, and X7, each of which may be a positive or negative value. The rest of the coefficients are zero coefficients. Had the scan order in FIG. 5B been used, the coefficients that are encoded in the bitstream are [X1, X4, X2, X5, X6, X3, 0, X7, EOB], and these coefficients (including the zero coefficient) would contribute to the data rate estimation.

At step 402, a group of coefficients for a partition portion of a quantized transform coefficient matrix is calculated, wherein the coefficients are processed in raster order. The quantized transform coefficient matrix is a square matrix, and it may be partitioned into a sequence of partition portions. The coefficients are grouped into a partition portion based on raster order. For example, the first partition portion includes the first group of coefficients in raster order, the second partition portion includes the next group of coefficients in raster order, and so on. In some embodiments, each partition portion of the quantized transform coefficient matrix may include a predetermined number of coefficients. In some embodiments, each partition portion of the quantized transform coefficient matrix may be an integer number of rows of the matrix.

For example, a partition portion may include two rows of quantized transform coefficient matrix 500. The first partition portion includes the coefficients at (0, 0), (0, 1), (0, 2), (0, 3), (1, 0), (1, 1), (1, 2), (1, 3); the second partition portion includes the coefficients at (2, 0), (2, 1), (2, 2), (2, 3), (3, 0), (3, 1), (3, 2), and (3, 3). As shown in FIG. 5A, the first partition portion includes coefficients that are scanned on the first row, from the left to the right, and then on the second row, from the left to the right.

At step 404, the first data rate estimation corresponding to the quantized transform coefficient matrix is updated based on the group of coefficients, wherein the update is based on a maximum end-of-block for the quantized transform coefficient matrix. Continuing with quantized transform coefficient matrix 500 above, the last non-zero coefficient, X7, is located at (2, 1), and therefore the EOB is located at (2, 1) of the matrix. However, since the EOB is not known when scanning in raster order, the EOB is assumed to be the maximum EOB possible value, i.e., at location (3, 3), at the end of the entire quantized transform coefficient matrix 500. The coefficients [X1, X2, X3, 0, X4, X5, 0, 0] are used to update the data rate estimation. The data rate estimation estimates the rate contribution for sending the coefficients [X1, X2, X3, 0, X4, X5, 0, 0] in the bitstream. Different values of the coefficients require different numbers of bits to be sent in the bitstream. The zero coefficients at (0, 3), (1, 2), and (1, 3), which are not in the actual scan order prior to the actual EOB (as shown in FIG. 5A), are used to update and contribute to the first data rate estimation. These zero coefficients introduce some errors to the first data rate estimation.

At step 406, an end-of-block estimate is updated based on the group of coefficients. The end-of-block estimate is set to the location of the last non-zero coefficient processed in the current partition portion of the matrix. For example, in FIG. 5B, the last non-zero coefficient in the first partition portion of the matrix is X5, and the end-of-block estimate may be set to location (1, 1) of the matrix. This end-of-block estimate is correct unless additional non-zero coefficients are found in the remaining portions of the quantized transform coefficient matrix.

At step 408, whether there is another partition portion of the quantized transform coefficient matrix left to be processed is determined. With continued reference to matrix 500 above, since there is a second partition portion of the quantized transform coefficient matrix left to process, process 400 proceeds to step 402 after the first partition portion is finished.

At step 402, a second group of coefficients for a partition portion of a quantized transform coefficient matrix is calculated, wherein the coefficients are processed in raster order. The second partition portion includes the coefficients at (2, 0), (2, 1), (2, 2), (2, 3), (3, 0), (3, 1), (3, 2), and (3, 3).

At step 404, the first data rate estimation corresponding to the quantized transform coefficient matrix is updated based on the second group of coefficients, wherein the update is based on the maximum end-of-block for the quantized transform coefficient matrix. Continuing with quantized transform coefficient matrix 500 above, the last non-zero coefficient, X7, is located at (2, 1), and therefore the actual EOB is located at (2, 1) of the matrix. However, since the EOB is not known when scanning in raster order, the EOB is assumed to be the maximum EOB possible value, i.e., at location (3, 3), at the end of the entire quantized transform coefficient matrix 500. The coefficients [X6, X7, 0, 0, 0, 0, 0, 0] may be used to update the data rate estimation. Besides X6, X7, and the zero coefficient at (3, 0) that are valid coefficients to be included in the rate estimation, the zero coefficients at (2, 2), (2, 3), (3, 1), (3, 2) and (3, 3) that are not in the scan order and before the actual EOB (as shown in FIG. 5A) are also used to update and contribute to the first data rate estimation, which introduces some errors, and therefore the rate estimation is a quick but rough rate estimation.

At step 406, the end-of-block estimate is updated based on the second group of coefficients. The end-of-block estimate is set to the location of the last non-zero coefficient processed in the current partition portion of the matrix. For example, in FIG. 5A, the last non-zero coefficient in the first partition portion of the matrix is X7, and the end-of-block estimate may be set to location (2, 1) of the matrix. This end-of-block estimate is correct because there are no additional portions of the quantized transform coefficient matrix to process.

At step 408, whether there is another partition portion of the quantized transform coefficient matrix left to be processed is determined. In matrix 500, since there is no additional partition portion of the quantized transform coefficient matrix left to be processed, process 400 is complete and exits at 410.

With continued reference to process 300 in FIG. 3, at step 304, a true end-of-block is determined after the transform unit of quantized transform coefficients is processed. The true end-of-block is the most recently updated end-of-block estimate obtained at step 406 of process 400. The true end-of-block for quantized transform coefficient matrix 500 is the location of the coefficient X7, which is location (2, 1) of the matrix.

At step 306, a second rate estimate corresponding to the transform unit of quantized transform coefficients is updated based on quantized transform coefficients that are processed in raster order and based on the true end-of-block.

Figure 6:
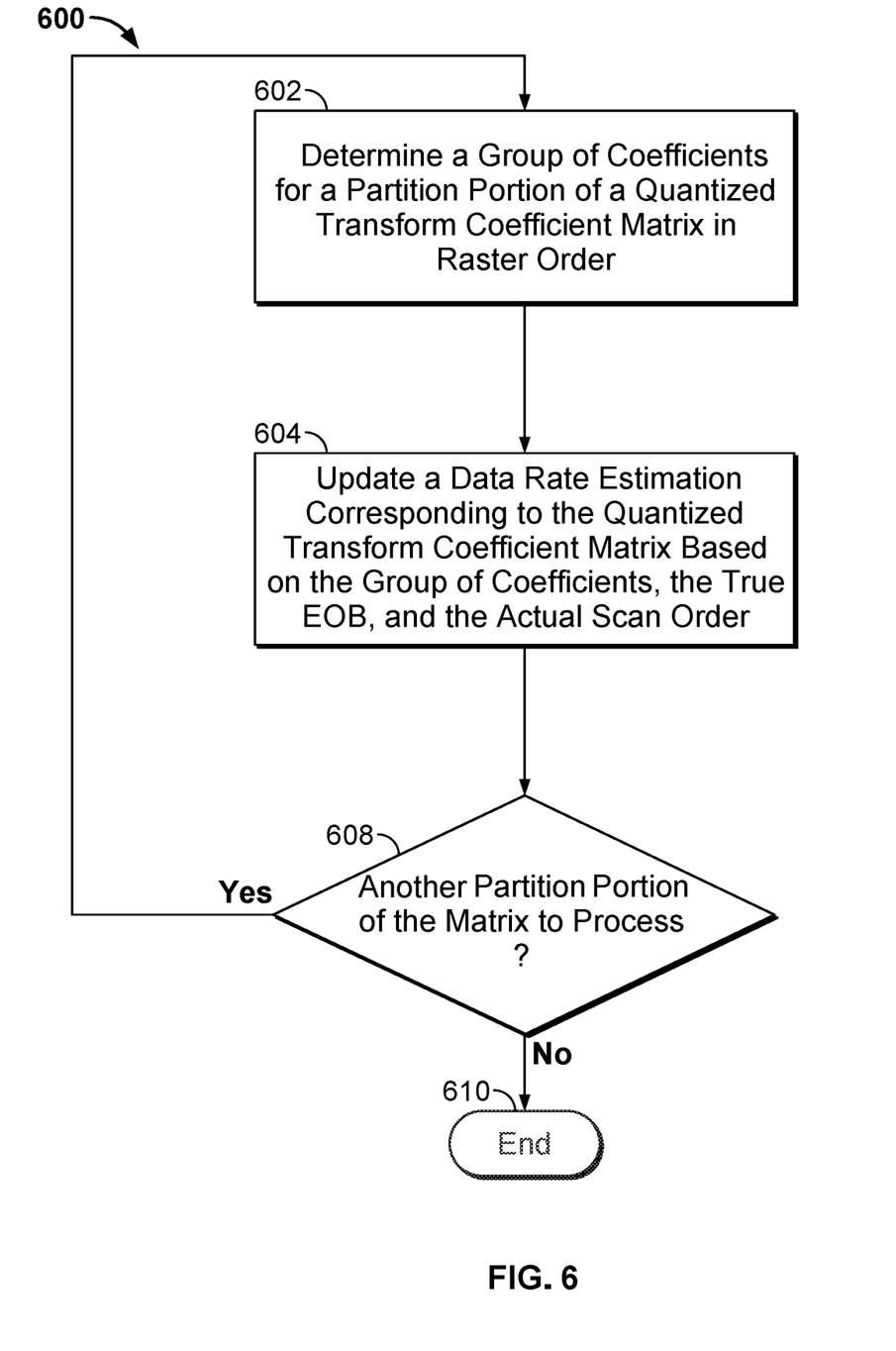
FIG. 6 illustrates a process 600 for determining a second rate estimation corresponding to a transform unit of quantized transform coefficients.

FIG. 6 illustrates a process 600 for determining a second rate estimation corresponding to a transform unit of quantized transform coefficients. In some embodiments, process 600 may be performed at step 306 to update the second data rate estimation based on the plurality of quantized transform coefficients that are processed in raster order and based on the true end-of-block and the actual scan order of the transform unit.

At step 602, a group of coefficients for a partition portion of a quantized transform coefficient matrix is determined, wherein the coefficients are processed in raster order. The quantized transform coefficient matrix may be partitioned into a plurality of portions. The coefficients are grouped into a partition portion based on raster order. In some embodiments, each partition portion of the quantized transform coefficient matrix may be a predetermined number of coefficients. In some embodiments, each partition portion of the quantized transform coefficient matrix may be an integer number of rows of the matrix.

In some embodiments, the partition portions are different from the partition portions of those in process 400. In some embodiments, the partition portions are identical to the partition portions of those in process 400. For example, a partition portion may be two rows of quantized transform coefficient matrix 500. The first partition portion includes the coefficients at (0, 0), (0, 1), (0, 2), (0, 3), (1, 0), (1, 1), (1, 2), (1, 3); the second partition portion includes the coefficients at (2, 0), (2, 1), (2, 2), (2, 3), (3, 0), (3, 1), (3, 2), and (3, 3). As shown in FIG. 5A, the first partition portion includes coefficients that are scanned on the first row, from left to right, and then on the second row, from left to right.

At step 604, the second data rate estimation corresponding to the quantized transform coefficient matrix is updated based on the group of coefficients, wherein the update is based on the true end-of-block and the actual scan order for the quantized transform coefficient matrix. The true end-of-block was determined at step 304 of process 300 above. Continuing with quantized transform coefficient matrix 500 above, the true EOB is located at (2, 1) of the matrix. The update is additionally based on the actual scan order that is supposed to be used for scanning the matrix. With knowledge of the true EOB and the actual scan order, the coefficients X1, X2, X3, X4, and X5 in the first and second rows are determined as contributing to the data rate estimation, but the zero coefficients at (0, 3), (1, 2), and (1, 3), which are not in the scan order prior to the actual EOB as shown in FIG. 5B, are determined as not contributing to the data rate estimation, and therefore are excluded from the rate estimation. In some embodiments, updating the second data rate estimation includes correcting the rate estimation by accounting for the coefficients that were incorrectly included (i.e., the zero coefficients at (0, 3), (1, 2), and (1, 3)) in the first rate estimation.

At step 608, whether there is another partition portion of the quantized transform coefficient matrix left to be processed is determined. With continued reference to the example above, since there is a second partition portion of the quantized transform coefficient matrix 500 left to be processed, process 600 proceeds to step 602 after the first partition portion is finished.

At step 602, a second group of coefficients for a partition portion of a quantized transform coefficient matrix is determined, wherein the coefficients are processed in raster order. Continuing with the above example, the second partition portion includes the coefficients at (2, 0), (2, 1), (2, 2), (2, 3), (3, 0), (3, 1), (3, 2), and (3, 3).

At step 604, the second data rate estimation corresponding to the quantized transform coefficient matrix is updated based on the group of coefficients, wherein the update is based on the true end-of-block and the actual scan order for the quantized transform coefficient matrix. The true end-of-block was determined at step 304 of process 300 above. Continuing with quantized transform coefficient matrix 500 above, the true EOB is located at (2, 1) of the matrix. The update is also based on the actual scan order that is supposed to be used for scanning the matrix. With knowledge of the true EOB and the actual scan order, the coefficients X6 and X7 in the third row and the zero coefficient at (3, 0) in the fourth row (as shown in FIG. 5B) are determined as contributing to the data rate estimation, but the zero coefficients at (2, 2), (2, 3), (3, 1), (3, 2) and (3, 3), which are not in the scan order prior to the actual EOB as shown in FIG. 5B, are determined as not contributing to the data rate estimation. In some embodiments, updating the second data rate estimation includes correcting the rate estimation by accounting for the coefficients that were incorrectly used (i.e., the zero coefficients at (2, 2), (2, 3), (3, 1), (3, 2) and (3, 3)) in the first rate estimation.

At step 608, it is determined whether there is another partition portion of the quantized transform coefficient matrix left to be processed. Since there is no additional partition portion of the quantized transform coefficient matrix 500 left to be processed, process 600 is complete and exits at 610.

In some embodiments, only the first pass is performed to obtain the intermediate rate estimation, and the second pass is disabled. This configuration is useful for power saving. It is useful for devices or platforms (e.g., edge devices) where computing resources are limited. In some embodiments, the intermediate rate estimation may be modified by scaling the rate contribution of at least some of the zero coefficients by one or more scale factors. In some embodiments, the scaling of the rate contribution of some of the zero coefficients may be performed before an actual EOB is found.

In some embodiments, the first pass is combined with a coefficient optimization process. The inputs to the coefficient optimization process are the quantized coefficients.

In some embodiments, both the first pass and the second pass are performed to obtain the second, more accurate rate estimation, which may be useful for client devices or platforms that require more accurate rate estimations. In some embodiments, the second pass may be performed in parallel to the inverse quantization and inverse transform (see modules 212, 214, and 218), such that there are enough cycles for the second pass.

In some embodiments, the second pass may be initiated prior to the completion of the first pass. The locations of the non-zero coefficients in a certain partition portion of the matrix may be used to eliminate some of the values that the final EOB may take, and therefore the process may determine that some of the coefficients in a prior partition portion of the matrix are coefficients that should contribute to the rate estimation even when the true EOB is not known. In this case, the second pass may start to process the prior partition portion without waiting for the completion of the first pass. The advantage of starting the second pass earlier is that it can save memory. For example, if the second pass is started when the first pass has processed the $x^{th}$ row of the matrix, then only the first $x^{th}$ rows of the matrix are needed to be stored in memory.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A hardware video processor, comprising:
   an interface that receives a specification of a candidate mode of a portion of a video; and
   a rate estimation module including circuitry to:
      partition a quantized transform coefficient matrix associated with the portion of the video into a sequence of partition portions, wherein coefficients of the quantized transform coefficient matrix are grouped into the sequence of partition portions based on a hardware implemented scan order, wherein the hardware implemented scan order is different from a specified scan order of the candidate mode, and wherein an end-of-block is a location of a last non-zero coefficient in the specified scan order;
      process each partition portion in an order of the sequence of partition portions in a first pass, wherein for each partition portion:
         determine a group of coefficients in the partition portion;
         update a first data rate estimation for the quantized transform coefficient matrix based on at least some coefficients of the group of coefficients in the partition portion and a maximum end-of-block, wherein the maximum end-of-block is a maximum possible value of the end-of-block; and
         update an end-of-block estimation of the quantized transform coefficient matrix based on at least some coefficients of the group of coefficients in the partition portion, comprising updating the end-of-block estimation to a location of a last non-zero coefficient in the group of coefficients, and keeping the end-of-block estimation unchanged in the event that the group of coefficients comprises zero coefficients only; and
      determine a first resulting data rate estimation and a true end-of-block of the quantized transform coefficient matrix after the first pass, wherein the true end-of-block comprises a correct location of a last non-zero coefficient in the specified scan order.

2. The processor of claim 1, wherein the first resulting data rate estimation of the quantized transform coefficient matrix is determined based on the first data rate estimation, and wherein the true end-of-block of the quantized transform coefficient matrix is determined based on the end-of-block estimation.

3. The processor of claim 2, wherein the true end-of-block comprises a most recently updated end-of-block estimation after the first pass.

4. The processor of claim 1, wherein a first group of coefficients based on the hardware implemented scan order is grouped into a first partition portion in the sequence of partition portions, and a second group of coefficients based on the hardware implemented scan order is grouped into a second partition portion in the sequence of partition portions.

5. The processor of claim 4, wherein the hardware implemented scan order is a raster order, and wherein the first partition portion comprises a first row of the quantized transform coefficient matrix.

6. The processor of claim 1, wherein the maximum end-of-block comprises a location of a last coefficient in a last row and a last column of the quantized transform coefficient matrix.

7. The processor of claim 6, wherein updating the first data rate estimation for the quantized transform coefficient matrix based on the at least some coefficients of the group of coefficients in the partition portion and the maximum end-of-block comprises:
using at least one zero coefficient in the group of coefficients to update the first data rate estimation, wherein the at least one zero coefficient is before the maximum end-of-block, and wherein the at least one zero coefficient is not in the specified scan order prior to the true end-of-block.

8. The processor of claim 1, wherein the rate estimation module includes circuitry:
partition the quantized transform coefficient matrix associated with the portion of the video into a second sequence of partition portions, wherein the coefficients of the quantized transform coefficient matrix are grouped into the second sequence of partition portions based on the hardware implemented scan order, wherein the hardware implemented scan order is different from the specified scan order of the candidate mode;
process each partition portion in an order of the second sequence of partition portions in a second pass, wherein for each partition portion:
determine a group of coefficients in the partition portion; and
update a second data rate estimation for the quantized transform coefficient matrix based on at least some coefficients of the group of coefficients in the partition portion, the true end-of-block, and the specified scan order; and
determine a second resulting data rate estimation after the second pass.

9. The processor of claim 8, wherein updating the second data rate estimation for the quantized transform coefficient matrix based on at least some coefficients of the group of coefficients in the partition portion, the true end-of-block, and the specified scan order comprises:
excluding at least one zero coefficient in the group of coefficients for updating the second data rate estimation, wherein the at least one zero coefficient is not in the specified scan order prior to the true end-of-block.

10. The processor of claim 8, wherein the rate estimation module includes circuitry to:
during the first pass, eliminate one or more possible values for the true end-of-block based on a location of a non-zero coefficient in the quantized transform coefficient matrix, and in response, determine that some of the coefficients in the quantized transform coefficient matrix are coefficients that are contributing to the second data rate estimation even when the true end-of-block is not yet known, and in response, initiate the second pass before the first pass is finished.

11. The processor of claim 1, wherein the rate estimation module includes circuitry to:
modify the first resulting data rate estimation by scaling a rate contribution of at least one zero coefficient by a scale factor, and wherein the modification is performed before the true end-of-block is found.

12. A method, comprising:
receiving by an interface a specification of a candidate mode of a portion of a video;
partitioning a quantized transform coefficient matrix associated with the portion of the video into a sequence of partition portions, wherein coefficients of the quantized transform coefficient matrix are grouped into the sequence of partition portions based on a hardware implemented scan order, wherein the hardware implemented scan order is different from a specified scan order of the candidate mode, and wherein an end-of-block is a location of a last non-zero coefficient in the specified scan order;
processing each partition portion in an order of the sequence of partition portions in a first pass, wherein for each partition portion:
determining a group of coefficients in the partition portion;
updating a first data rate estimation for the quantized transform coefficient matrix based on at least some coefficients of the group of coefficients in the partition portion and a maximum end-of-block, wherein the maximum end-of-block is a maximum possible value of the end-of-block; and
updating an end-of-block estimation of the quantized transform coefficient matrix based on at least some coefficients of the group of coefficients in the partition portion, comprising updating the end-of-block estimation to a location of a last non-zero coefficient in the group of coefficients, and keeping the end-of-block estimation unchanged in the event that the group of coefficients comprises zero coefficients only; and
determining a first resulting data rate estimation and a true end-of-block of the quantized transform coefficient matrix after the first pass, wherein the true end-of-block comprises a correct location of a last non-zero coefficient in the specified scan order.

13. The method of claim 12, further comprising:
determining the first resulting data rate estimation of the quantized transform coefficient matrix based on the first data rate estimation; and
determining the true end-of-block of the quantized transform coefficient matrix based on the end-of-block estimation.

14. The method of claim 13, wherein the true end-of-block comprises a most recently updated end-of-block estimation after the first pass.

15. The method of claim 12, wherein a first group of coefficients based on the hardware implemented scan order is grouped into a first partition portion in the sequence of partition portions, and a second group of coefficients based on the hardware implemented scan order is grouped into a second partition portion in the sequence of partition portions.

16. The method of claim 15, wherein the hardware implemented scan order is a raster order, and wherein the first partition portion comprises a first row of the quantized transform coefficient matrix.

17. The method of claim 12, wherein the maximum end-of-block comprises a location of a last coefficient in a last row and a last column of the quantized transform coefficient matrix.

18. The method of claim 17, wherein updating the first data rate estimation for the quantized transform coefficient matrix based on the at least some coefficients of the group of coefficients in the partition portion and the maximum end-of-block comprises:

using at least one zero coefficient in the group of coefficients to update the first data rate estimation, wherein the at least one zero coefficient is before the maximum end-of-block, and wherein the at least one zero coefficient is not in the specified scan order prior to the true end-of-block.

19. The method of claim 12, further comprising:

partitioning the quantized transform coefficient matrix associated with the portion of the video into a second sequence of partition portions, wherein the coefficients of the quantized transform coefficient matrix are grouped into the second sequence of partition portions based on the hardware implemented scan order, wherein the hardware implemented scan order is different from the specified scan order of the candidate mode;

processing each partition portion in an order of the second sequence of partition portions in a second pass, wherein for each partition portion:

determining a group of coefficients in the partition portion; and updating a second data rate estimation for the quantized transform coefficient matrix based on at least some coefficients of the group of coefficients in the partition portion, the true end-of-block, and the specified scan order; and determining a second resulting data rate estimation after the second pass.

20. A system, comprising:

a communication interface to receive a specification of a candidate mode of a portion of a video; and a processor coupled to the communication interface and comprising logic to:

partition a quantized transform coefficient matrix associated with the portion of the video into a sequence of partition portions, wherein coefficients of the quantized transform coefficient matrix are grouped into the sequence of partition portions based on a hardware implemented scan order, wherein the hardware implemented scan order is different from a specified scan order of the candidate mode, and wherein an end-of-block is a location of a last non-zero coefficient in the specified scan order;

process each partition portion in an order of the sequence of partition portions in a first pass, wherein for each partition portion:

determine a group of coefficients in the partition portion;

update a first data rate estimation for the quantized transform coefficient matrix based on at least some coefficients of the group of coefficients in the partition portion and a maximum end-of-block, wherein the maximum end-of-block is a maximum possible value of the end-of-block; and update an end-of-block estimation of the quantized transform coefficient matrix based on at least some coefficients of the group of coefficients in the partition portion, comprising updating the end-of-block estimation to a location of a last non-zero coefficient in the group of coefficients, and keeping the end-of-block estimation unchanged in the event that the group of coefficients comprises zero coefficients only; and determine a first resulting data rate estimation and a true end-of-block of the quantized transform coefficient matrix after the first pass, wherein the true end-of-block comprises a correct location of a last non-zero coefficient in the specified scan order.

* * * * *